Figure 1:
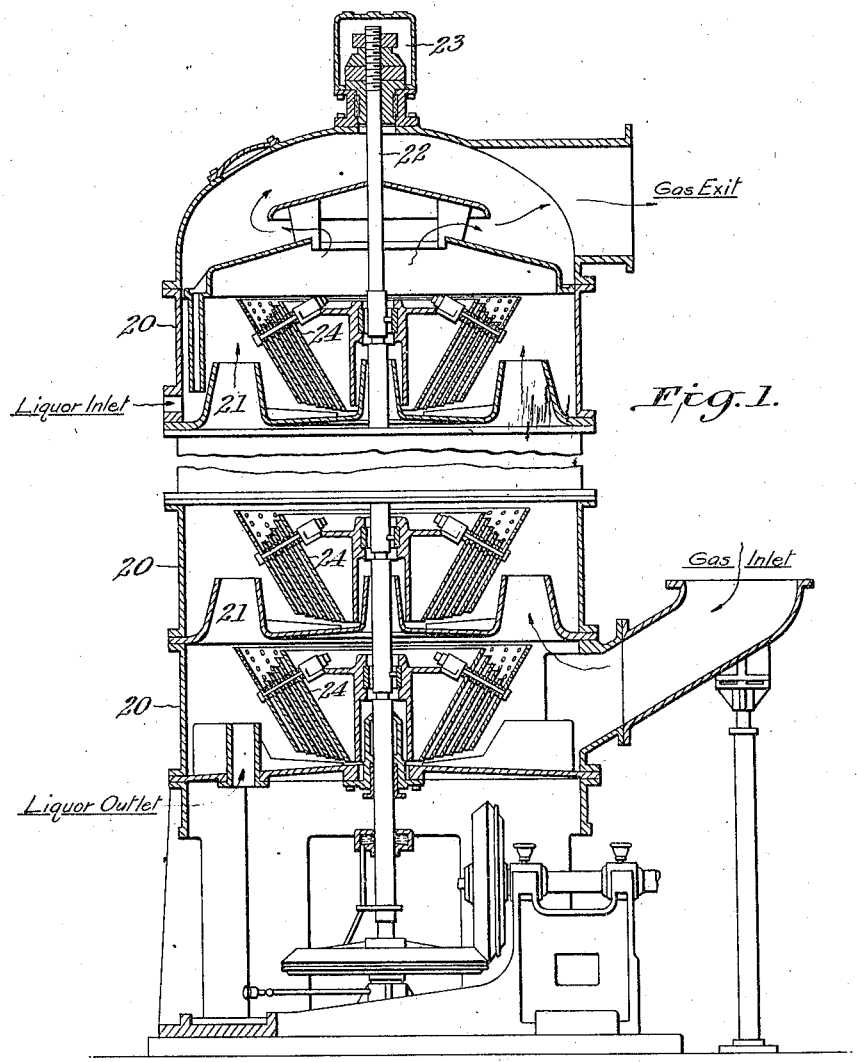
Figure 2:
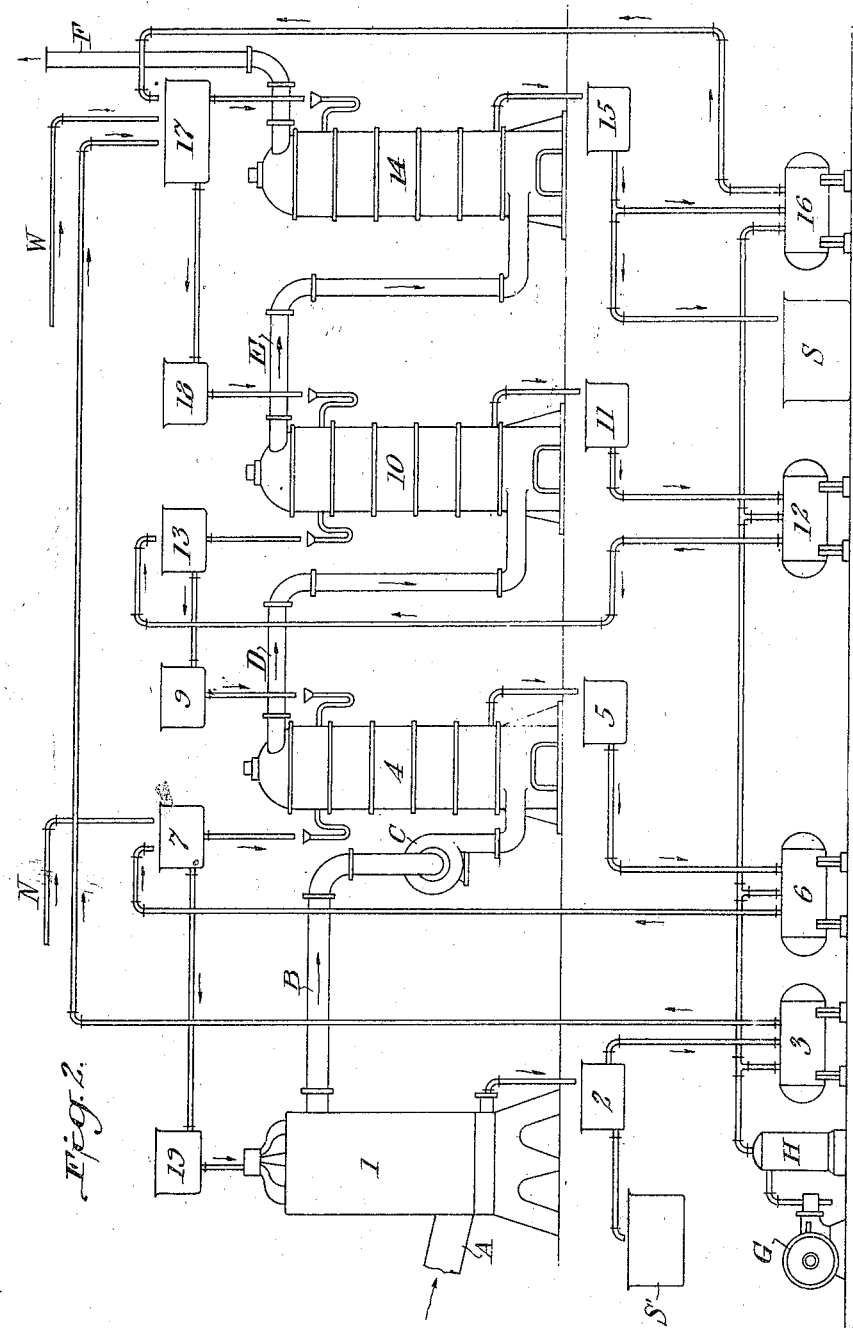
Figure 3:
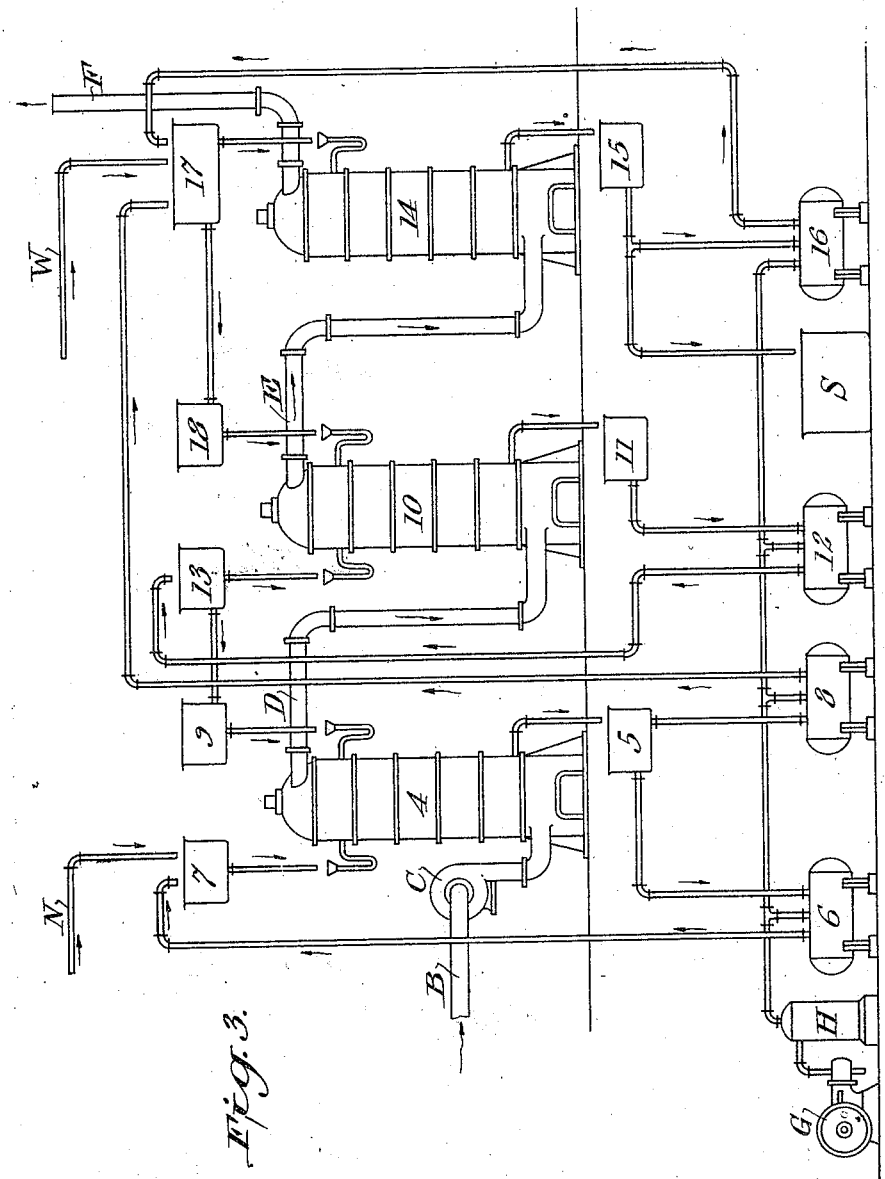

Patented May 22, 1923.

1,456,065

UNITED STATES PATENT OFFICE.

WILLIAM F. LAMOREAUX, OF ISABELLA, TENNESSEE.

MANUFACTURE OF SULPHURIC ACID.

Application filed May 29, 1922. Serial No. 564,454.

*To all whom it may concern:*

Be it known that I, WILLIAM F. LAMOREAUX, a citizen of the United States, residing at Isabella, in the county of Polk and State of Tennessee, have invented certain new and useful Improvements in the Manufacture of Sulphuric Acid, of which the following is a specification.

This invention relates to an improved process or method of producing sulphuric acid from sulfur dioxid obtained from the burning of elemental sulfur, or from oxides of sulfur such as are contained in variable admixture with air in the gases generated by or liberated from any furnace smelting, roasting, or calcining pyrite ores or other sulfur bearing materials.

My invention further relates to improvements in the apparatus which is used in the manufacture of sulphuric acid and especially to the supplementing of the usual chambers and towers, or indeed the substitution therefor, with apparatus such as will increase the quantity of acid produced in a given amount of reaction space and in a given interval of time and with a less amount of labor and materials, this being accomplished by the introduction of mechanical means for inducing and maintaining a rapid and constant intensive commingling of the acid making materials thereby providing for a rapid and thorough bringing into contact of the molecules of all of the reacting fluids both gaseous and liquid, as will be hereinafter more fully set forth in such manner as may be clearly understood and practiced by those versed in the manufacture of sulphuric acid.

In the prior art of sulphuric acid manufacture there is found no disclosure of any method of producing strong sulphuric acid (that is, acid containing more than 90 per cent of $H_2SO_4$) by direct chemical reaction, except through the use of solid catalytic agents,—such as platinum, or iron-oxide. All other methods have comprised the use of evaporation effects obtained in concentrating towers or other vessels, wherein the weaker acid is subjected to heat sufficient to elevate the acid to its boiling point, or distillation temperature, and whereby the acid may be finally concentrated to a strength of approximately ninety-eight per cent of $H_2SO_4$.

The object of my present invention is to produce directly by chemical reaction sulphuric acid of 60 degrees Baumé strength (77.67 per cent $H_2SO_4$) or higher degree, without the use of any solid catalytic agent and without the use of extraneous heat.

In my invention, the customary Glover tower may or may not be used, as in any particular case seems most desirable, but I prefer to not use the Glover tower except in such cases where the manufactured acid must be quite entirely free of any dissolved nitrogen compounds.

In my invention oxides of nitrogen, either in gaseous form or dissolved in sulphuric acid are used as the oxidizing agents, although they function more as catalytic, or pseudo-catalytic, agents than otherwise, since the oxygen required for formation of sulphuric anhydrid is in reality derived almost entirely from the atmosphere through the intermediary agency of the nitrogen-oxide compounds. The nitrogen oxides may be introduced through the Glover tower (in the usual manner, if such a tower is used) or in the form of sodium nitrate or nitric acid which may be introduced directly into the reaction apparatus which I employ.

In the formation of sulphuric anhydrid by the reaction $2SO_2 + O_2 = 2SO_3$, a large amount of heat is liberated. It is an exothermic reaction and, in accordance with the well known laws of physical chemistry, such reactions are quantitatively augmented by the withdrawal or removal of such liberated heat substantially as soon as formed. If this heat is not withdrawn, the reactions are retarded and never attain quantitative completion. To remove or dissipate the heat of reaction there are employed in the chamber process large leaden chambers to provide adequate area of surface for radiation of the heat to the outer atmosphere, but this object is always far from perfect attainment. Similarly, in the so-called "contact," or catalytic, processes of sulphuric acid manufacture, elaborate and costly heat-exchangers or other means of cooling the reacting gases have to be provided. My invention comprises the instant and simultaneous absorption of the heat by providing intimate contact of the gases (having low specific heats) with the cooled liquids (having comparatively higher specific heats) which are continuously cooled and circulated in large volumes through the acid-making apparatus which I employ.

In certain other processes for the manufacture of sulphuric acid the sulfur dioxide is brought into contact with large volumes of nitrous vitriol (nitroso-sulphuric acid or $HSNO_5$) in such quantity that the power of the nitroso-sulphuric acid to oxidize the $SO_2$ is maintained unconditionally,—that is, so that there is no nitroso-sulphuric acid in the plant which is so weak as to be inactive for the oxidation of the sulfur dioxide. In such processes it is necessary to keep the strength of the nitroso-sulphuric acid within certain limits, in order that on the one hand sufficient water for quick reaction may be present in the acid and on the other hand the capacity of the acid to contain nitrous gases and take up nitrous gases that have been liberated may nevertheless be preserved. In my invention, these limitations are not necessarily imposed, for I cause the $SO_2$ laden gases to enter the reaction apparatus wherein, in counter-flow direction, there is introduced strong nitroso-sulphuric acid or nitrous vitriol, which in its downward flow is progressively and continuously denitrated by the ascending sulfur dioxide. In this manner the gases rich in sulfur dioxide are brought into contact with the acid containing the minimum quantity of nitrogen oxides and the gases containing the already largely depleted $SO_2$ content are brought in contact with the maximum quantity of nitrogen oxides. Through reaction with the sulfur dioxide such nitrogen oxides as may be liberated in the lower part of the reaction apparatus are in part re-absorbed in the upper levels of the apparatus and descend again into the reaction zone. Some of the nitrogen oxides are, however, not re-absorbed in this apparatus, and that these oxides may and shall be absorbed and thus recovered for re-use, a second unit of apparatus is provided for this purpose.

The above described method of operation is the one which I generally prefer to use but I have commonly employed the method in which the reacting fluids, both gaseous and liquid, are caused to flow in the same direction through the acid-making apparatus and I do not, therefore, wish to restrict my invention to the first method alone but rather to include both methods, either of which may be employed without departing from my invention.

Throughout these reactions there is maintained a deficiency of water, such as would otherwise be necessary for the formation of $H_2SO_4$, and consequently practically only sulphuric anhydrid ($SO_3$) is produced and liberated in gaseous form, and since the strengths of the acid in the first and second units of my apparatus are not suitable for the quantitative absorption of the sulphuric anhydrid thus formed (nor is it intentional or necessary that they should be), the sulphuric anhydrid is conducted to the third unit of apparatus containing sulphuric acid of such strength that all of the sulphuric anhydrid is completely absorbed therein.

In the "chamber" process of manufacturing sulphuric acid, whenever there occurs a deficiency of water, a large quantity of nitroso-sulphuric acid will be left undecomposed and by excessive concentration of the acid accumulating in the bottoms of the chambers the nitrogen compounds will be retained in solution, thus removing them from the atmosphere of the chambers and so losing their aid in oxidizing the sulfur dioxide; but in my present invention this undesirable condition is avoided, or rather advantage is taken of the solubility of these nitrogen compounds in sulphuric acid, for the sulfur dioxide is caused to react directly with these nitrogen compounds while retained in solution.

In all chemical reactions involving either homogeneous or heterogeneous equilibria, it is known through the well established laws of physical chemistry that the removal of the products of reaction substantially as soon as formed will augment the further reaction of the remaining components. Advantage of this law is taken in my present invention through the continuous and concurrent removal of the sulphuric anhydrid substantially as soon as formed thus accelerating and augmenting the reaction between the sulfur dioxide and oxygen; this reaction, as previously stated, being brought about through the intermediary, or pseudo-catalytic, agency of the nitrogen compounds present in the gaseous atmosphere, or in solution in the circulating nitro-sulphuric acid.

It is a further well known fact that catalytic, or pseudo-catalytic, action is closely associated with the phenomena of adsorption and, in turn, the latter phenomena may be rationally considered as manifestations of surface phenomena which are closely akin to the forces of adhesion. An extremely subdivided phase possesses a relatively large surface compared with the mass of the substance and in applying my researches to the investigation of these phenomena as pertaining to the manufacture of sulphuric acid, I have discovered that solutions of the nitrogen oxides in sulphuric acid (forming the so-called nitroso-sulphuric acid) may be employed as a catalytic agent for the reaction $2SO_2 + O_2 = 2SO_3$, provided that the nitroso-sulphuric acid is subdivided to an extremely high degree of dispersion. Such a high degree of dispersion may be attained by the means described in my co-pending application (Serial No. 492,673 filed Aug. 16th, 1921) and by maintaining the strength or specific gravity of the nitroso-sulphuric acid at such a degree that there is never present, in proportion to the sulfur dioxide which is oxidized to sulfur trioxide, a sufficient amount of water directly to form sulphuric acid, then, in that event the sulphuric anhydrid formed will not be absorbed in the nitroso-sulphuric acid but will be liberated into the gaseous phase whence it may be removed by the gas stream and subsequently absorbed in strong sulphuric acid.

In the above manner the acid used for absorbing the sulphuric anhydrid would continuously increase in strength due to the solution of the $SO_3$, but to overcome this, weak acid obtained from the first unit is continuously added so that the strength of the absorbing acid is maintained at any predetermined degree by these means. The strength of the absorbing acid should preferably be kept at (a) about 97 to 99 per cent $H_2SO_4$ or (b) should contain 27 per cent (or more) of free $SO_3$. Each of these particular strengths of acid offers the advantage that sulphuric acid of such strengths have a very slight corroding action, if any, upon iron, so that this metal may be used as a material for the construction of the absorption apparatus, and the finished product will contain only small traces of iron.

The reactions that actually take place according to my invention are rather obscure, although the combined results of these reactions are as though the reaction was

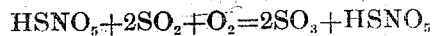
$$HSNO_5 + 2SO_2 + O_2 = 2SO_3 + HSNO_5$$

from which it will be seen that the nitroso-sulphuric acid ($HSNO_5$) acts as the catalytic, or pseudo-catalytic, agent through the intermediary of which the oxidation of the sulfur dioxide is effected.

It will be observed from the above equation that the nitroso-sulphuric acid constitutes a liquid phase and that in the gaseous phase, two molecules of $SO_2$ unite with one molecule of $O_2$ to produce two molecules of $SO_3$, therefore, there occurs a shrinkage of one-third in the combined volume of the reacting $SO_2$ and $O_2$ which dictates the reduction of temperature and increase of pressure in order to augment the rate of reaction, therefore, these two variables are, at all times, kept superinduced and under careful control.

The production of high dispersion of the liquids and gases by the method as herein described, enables me to use a considerable pressure throughout the system, such pressure, as above pointed out, enhancing the reactions. Such pressure may be many times greater than can be used in ordinary lead chambers. For example, I have used pressure up to 16 pounds absolute pressure, and this pressure may be increased to the extent that economical operation will warrant.

In principle, in my invention the rapid oxidation of sulfur dioxide appears to be brought about in the following manner: With the extreme dispersion of the nitroso-sulphuric acid in the form of very fine spray or mist there is presented to the gases an enormous extent of liquid surface area thereby inducing such active adsorption phenomena that large volumes of both $SO_2$ and $O_2$ become adsorbed or concentrated upon the surface of the liquid and react to form $SO_3$ through the medium of the nitroso-sulphuric acid; but when the minute particles of liquid are subsequently coalesced and gathered into larger masses the adsorption power of the liquid is at once greatly reduced and it is no longer capable of retaining the $SO_3$,—the latter, therefore, escapes into the gaseous phase to be caried away in the gas stream, and finally to be absorbed and retained in concentrated sulphuric acid.

Having described the nature of the reactions believed to take place in the manufacture of sulphuric anhydrid according to my invention, and furthermore having shown or indicated wherein and whereby these reactions can be accelerated or augmented, I will now disclose several methods of acomplishing these desired ends, namely by producing the greatest possible area of reacting surface between the gaseous and liquid reagents, which method comprises the high degree of dispersion of the liquid phase within that of the gases, and also comprises the high degree of dispersion of the gaseous phase within that of the liquid.

To obtain this high degree of dispersion of the gaseous and liquid phases within each other respectively, I may employ any one of the well known rotary or centrifugal types of gas washers such as the Feld washer of vertical type, or the Theisen washer of horizontal type;—indeed, any type of apparatus that will produce such a state of high dispersion as to present the maximum area of reacting surface between the gases and liquids may be used to carry out the purpose of my invention but it is quite essential that with whatever type of apparatus that may be used there shall be effected a continuously proceeding method of dispersing the liquid phase components in order to produce newly formed surface films for the absorption of the gaseous phase components and immediately or simultaneously causing the disruption of such adsorbed films substantially as soon as formed, by coalescence in a collecting mass of liquid, said dispersion and coalescing continuing in a rapidly repeated cyclic order.

Suitable apparatus for carrying out my process is illustrated somewhat diagrammatically in the accompanying drawings, forming part of this specification, wherein—

Figure I is a section through one form of apparatus for finely subdividing liquid and bringing the particles into contact with the gases.

Figure II shows one arrangement of plant wherein the usual type of Glover tower may be used.

Figure III shows a modified arrangement of plant wherein no Glover tower is used.

In the accompanying drawing (Figure I), I have chosen the Feld washer to illustrate one type of well known and commercially used apparatus which I have successfully employed in carrying out my invention, but I do not wish to limit my invention to this particular type of apparatus or mechanism. The Feld washer consists of a number of separate washing chambers 20, mounted one above the other. The ports or openings 21 in the bottom of each chamber act as passages for the ascending gas, as well as overflows for the counter-current flow of the liquid. The vertical shaft 22 suspended from a self-centering, anti-friction bearing 23 is provided in each chamber with a series of concentric frustums of cones 24. The number of cones varies with the size of the apparatus. The spacing between the bottom of the chamber and the botttom edge of the cones increases toward the shell in order to provide for their equable immersion in the liquid, as well as to secure adequate agitation thereof. Such parts of this apparatus as come into contact with acid, are made of non-corrosive material such as lead, or are lead protected. When the vertical shaft 22 is revolved, these cones 24 pick up or pump the liquid which is thrown horizontally with considerable velocity through the outer perforated distributing cone. Additional impetus is given the liquid at this point by the greater rim speed of the distributor, and the liquid is projected through the gas space in the form of fine, high velocity spray, which, upon impact with the shell, is still further broken up into a mist or fog, thus producing a very high dispersion of the liquid absorbing-medium, and through which, and in intimate contact therewith, the gases are compelled to pass. There is also a continuous circulation of liquid within each washing chamber, and vertically downward from one chamber to another.

Furthermore the violent agitation of the liquid within each chamber of this apparatus causes an enforced entrainment of the reacting gases within the circulating liquid medium. In other words, by the violent agitation of the liquid the reacting gases are dispersed in the form of minute bubbles, thus obtaining a dispersion of the gaseous phase within that of the liquid. This is evidenced by the fact that immediately upon discontinuance of the agitation it will be found that the liquid effervesces due to the escape of the minute gas bubbles. These combined methods of dispersion, namely, (a) that of the liquid phase within the gaseous one and, (b) the dispersion of the gaseous phase within that of the liquid, together with the alternating humidifying and scrubbing effect to which the gases are subjected in each chamber, provides a means of enforcing the intimacy of contact and the extended area of reacting surface between gases and liquid necessary to accelerate and augment the chemical reactions involved in the manufacture of sulphuric acid according to my invention.

In Figure II, I have illustrated one of the ways of carrying my invention into effect, in which particular case the usual type of Glover tower may be used. The more essential pieces of apparatus comprise (a) the reaction apparatus 4, wherein the sulfur dioxide is oxidized to sulfur trioxide, or sulphuric anhydrid, through the intermediary agency of the oxides of nitrogen and nitroso-sulphuric acid; (b) the apparatus 10 wherein the nitrogen oxides which are set free in washer 4 are subsequently absorbed and recovered, this apparatus serving to perform the reactions usually accomplished by means of the well known Gay-Lussac towers, and (c) the sulphuric anhydrid is absorbed and recovered in solution by concentrated sulphuric acid as will be presently more clearly explained. In this same drawing (Figure II) the letter A designates the main flue conveying the sulfur-bearing gases from the furnace or roasting apparatus to the Glover tower which may be of usual construction designated by the numeral 1. In the flue A is usually built the nitrating apparatus for generating the nitric acid and oxides of nitrogen required in the subsequent oxidizing reactions, these compounds mixing with the sulfur dioxide prior to entrance into the bottom of the Glover tower. From the Glover tower 1, the gases are drawn through the pipe B by means of the centrifugal fan or pressure blower C and are in turn forced into the Feld washer or apparatus 4. From the washer 4, the residual gases (composed principally of nitrogen, oxygen, nitrogen oxides and sulphuric anhydrid) pass through the pipe D to the Feld washer or apparatus 10 where the nitrogen compounds are absorbed. From the washer 10, the gases wholly or substantially free from all valuable nitrogen compounds but yet containing the sulphuric anhydrid are conducted through the pipe E to and passed through the washer 14 wherein the sulphuric anhydrid is entirely absorbed and recovered. From washer 14, the residual gases, substantially free from all valuable nitrogen and sulfur compounds, escape to the atmosphere through the exit pipe F. By means of the compressed air system G and H, the several acid-circulating systems are operated according to the usual practice in acid manufacture;—thus, the denitrated and concentrated acid (of approximately 60 degree Baumé gravity) from the Glover tower 1 is collected and cooled in the tank 2 and by means of the monteju 3 is pumped to tank 17 in such quantities as may be found necessary to maintain the strength of the acid in tank 17 at approximately ninety-seven to ninety-nine per cent sulphuric acid; and from tank 17, the concentrated sulphuric acid flows to and through the washer 14 wherein the sulphuric anhydrid is absorbed and thence into tank 15 where the acid is cooled by means of suitable cooling or refrigerating coils, and from tank 15 the acid flows to the montejus 16 to be again pumped to tank 17 for re-circulation. In the process of absorbing the sulphuric anhydrid, the acid circulating through the washer 14 tends to increase in strength and unless precaution be taken to prevent the strength of the acid becoming greater than 97 to 99 per cent $H_2SO_4$ its absorption power,—that is, for retaining sulphuric anhydrid,—rapidly decreases, and for this reason the weaker acid from tank 2 is continuously added, (or water or steam may instead be added by means of the pipe W) to continuously dilute the acid in tank 17 so that its strength may be kept at any predetermined degree, preferably between 97 to 99 per cent $H_2SO_4$ or to contain more than 27 per cent free $SO_3$ as has been already explained. In proportion to the accumulation of the strong acid formed by absorption of sulphuric anhydrid in the washer 14, the amount in excess of the requirements for absorption purposes is drawn off into tank 8, this acid represents the current production of sulphuric acid made by my process. From time to time, either continuously or intermittently, as operating conditions may determine, a portion of concentrated acid from tank 17 is permitted to flow over to tank 18, thence flowing through washer 10, to admix with the weaker acid therein and so increase its strength in order that it may be maintained at approximately 59 to 61 degrees Baumé, this strength being best adapted to the rapid and complete absorption of gaseous oxides of nitrogen. From washer 10, the acid is collected and cooled in tank 11 and thence by means of monteju 12 is pumped to tank 13 for recirculation through washer 10. As and when the circulated acid in tank 13 becomes sufficiently saturated with oxides of nitrogen, thus forming the so-called nitroso-sulphuric acid, or nitrous vitriol, portions of this nitrous vitriol are withdrawn from tank 13 to tank 9 and caused to admix with the weaker nitrous vitriol which is meanwhile circulating through the Feld washer or reaction apparatus 4; by this means the strength or "nitrosity" of this circulating vitriol is kept at a predetermined strength proportional to the flaw and tenor of the sulfur dioxide which enters the reaction apparatus 4, and at the same time there is precluded a sufficient quantity (or differently stated,—there is maintained a deficient quantity) of water to unite with the sulfur trioxide, or sulphuric anhydrid, formed; whereas if sufficient water were otherwise present, it would unite with the anhydrid directly to form sulphuric acid. The "nitrosity" of the admixed acids from tanks 9 and 7 is so apportioned that the acid flowing from the reaction apparatus 4 into the cooling tank 5 may or shall have been, by reaction with sulfur dioxide, completely or almost wholly denitrated, and by means of montejus 6 the acid from tank 5 is continuously pumped to tank 7 thence to be re-circulated through the reaction apparatus 4. As any excess quantity of acid, more than that required for re-circulation, accumulates in tank 7, it is continuously or intermittently withdrawn to tank 19 thence to pass through the Glover tower 1 wherein it can be almost completely denitrated and at the same time concentrated to approximately 60 degree Baumé strength suitable for a finished marketable product which may be delivered to tanks, although a portion of this acid is usually returned back to the acid making system through monteju 3 to tank 17 and thus to resume the cyclic order of performance as described above. In case more intensive reactions are desired to be brought about in the reaction apparatus 4, additional reagents in the form of nitric acid or other sources of nitrogen-compounds may be added through pipe N, quite independently of, or to supplement, the amount of such nitrogen compounds concurrently introduced through the Glover tower 1.

In Figure III, I have illustrated another way of circulating the acid liquids such as may be employed in carrying out my invention without the use of a Glover tower. The essential pieces of apparatus comprise (a) the reaction apparatus 4, (b) the apparatus 10 for absorption of the nitrogen oxides; and (c) the apparatus 14 for the absorption of sulphuric anhydrid; in each case the apparatus chosen for the purpose of illustration consists of a Feld washer and each of which functions in the manner previously described. In this same drawing (Figure III) the letter B designates the main flue conveying the sulfur-bearing gases from the furnace or roasting apparatus to the centrifugal fan C, through and by means of which the gases are forced into the Feld washer or apparatus 4—in case, however, the temperature of the gases is too high for practicable operation of the centrifugal fan C, when placed as thus shown, then in that event it may be located between the reaction apparatus 4 and the absorption apparatus 10, and in this way the temperature of the gases will be sufficiently reduced during their passage through the reaction apparatus 4 so that they will have no harmful effect upon the fan. In the reaction apparatus 4, the sulfur-dioxide contained in the entering gases is oxidized to sulfur trioxide, or sulphuric anhyrid, through the intermediary agency of the oxides of nitrogen and nitroso-sulphuric acid which are simultaneously circulated through this apparatus 4. From the latter, the gases (consisting principally of nitrogen, oxygen, oxides of nitrogen and sulphuric anhydrid) pass through the pipe D to the Feld washer or apparatus 10 where the nitrogen compounds are absorbed. From the washer 10, the remaining gases pass through the pipe E to the apparatus 14 wherein the sulphuric anhydrid is entirely absorbed and recovered. From the washer 14, the residual gases escape to the atmosphere through exit pipe F. By means of the compressed air system G and H, the several acid-circulating systems are operated according to usual practice in acid manufacture. Through the pipe N, there is continuously or intermittently fed into tank 7 a supply of nitric acid, solution of sodium nitrate, or other sources of nitrogen compounds which by reaction with the sulphuric acid that is maintained in circulation through the apparatus 4 will produce those nitrogen compounds of suitable quality and in adequate quantities to act as the intermediary, or pseudo-catalytic, agents for the oxidation of sulfur dioxide in accordance with the purposes of my invention as hereinbefore set forth. The supply of nitrogen compounds thus added to the acid-making system through the pipe N is ordinarily that required to make up any depletion that normally occurs through the loss of these compounds; the amount added being so regulated that the "nitrosity" of the vitriol entering the top of the reaction apparatus 4 is at all times kept definitely proportioned to the amount of sulfur dioxide to be oxidized and, at the same time, so apportioned that the acid flowing from the reaction apparatus 4 into the cooling tank 5 shall have been completely, or almost wholly, denitrated by reaction with the $SO_2$; at all times the strength or gravity of the nitroso-sulphuric acid is maintained at, or adjusted to, such a degree that in proportion to the amount of $SO_2$ converted into $SO_3$ there is never present an adequate amount of water to combine with all of the latter anhydrid and thus form $H_2SO_4$,—consequently the $SO_3$ remains in the anhydrid form; all of these reactions being controlled principally by manipulation of the volumes, temperature, and gravity of the circulating acid which is caused to pass through the reaction apparatus. It will also be understood that the gases richest in sulfur dioxide and oxygen entering through the gas inlet B are brought into contact with denitrated sulphuric acid but, as they ascend through the reaction apparatus, they come into contact with nitrous vitriol of gradually increasing strength, and through reaction with the sulfur dioxid such nitrogen oxids as are liberated in the lower parts of the reaction apparatus are in turn partly reabsorbed in the upper levels and again descend into the reaction zone in a continuously repeated cyclic order;—some of these nitrogen oxides are, however, not absorbed in this apparatus but are carried by the gas-stream into the absorption apparatus 10. From the tank 13, a continuous flow of sulphuric acid (preferably of 59 to 60 degree Baumé gravity) is circulated through this absorption apparatus which absorbs and retains the nitrogen oxides in solution or combined chemically therewith in the form of nitroso-sulphuric acid, or nitrous vitriol; the latter thence flowing into the cooling tank 11 to be pumped by means of the monteju 12 to the tank 13, to be re-circulated through the absorption apparatus 10. As and when the acid in tank 13 becomes sufficiently saturated with oxides of nitrogen, portions of this nitrous vitriol are transferred to tank 9 for use in the reaction apparatus 4. During the progress of operations, the acid in circulating through the absorber 10 tends to gradually decrease in gravity due to dilution by water, or water vapor, contained in the gases; and to counteract this effect of dilution (which if not corrected would decrease the absorption power of the acid) concentrated acid from tanks 17 and 18 is added in such quantities that the admixed acids are maintained at a gravity of approximately 59 to 61 degrees Baumé. Through the absorption apparatus 14, there is continuously circulated sulphuric acid of any predetermined strength (but preferably of 97 to 99 per cent $H_2SO_4$ content) which acts as the sulphuric anhydrid absorption-agent; circulation being effected by means of the monteju 16 as shown. Due to the absorption of $SO_3$ the strength of this acid tends continuously to increase, and to correct and control the strength to a predetermined degree there is continuously introduced into the mixing tank 17 the required proportion of weaker and denitrated acid obtained from the tank 5; (or water, or steam may be added by means of the pipe W). In proportion to the accumulation of the strong acid formed by absorption of sulphuric anhydrid in the apparatus 14, the amount in excess of the requirements for absorption purposes is drawn off into tank S, this acid represents the current production of sulphuric acid made by my process.

It will be understood that the general arrangement of apparatus shown in Figures II and III are only two methods of carrying out my invention by means of a well known and commercially used type of gas-washer, and I do not wish to limit my invention to this particular arrangement of apparatus or to this particular type of apparatus or mechanism.

By means of these acid-circulating systems, the proper quantities and qualities of circulating acids, cooled to the proper working temperatures, can be easily kept under control so as to maintain a uniformity of quantitative and qualitative factors throughout the whole cycle of the chemical reaction; for, owing to the rapid circulation of both the gaseous and the liquid materials and the conveniently afforded means of regulating the quantities of these materials in varying proportion to each other, faulty conditions of operation can be promptly ascertained and corrections as promptly made, this elasticity of control being of the greatest importance in the manufacture of sulphuric acid.

My process is adapted for use in producing sulphuric acid from sulfur-dioxide laden gases, such as are obtained by burning sulfur or pyrites, or as by-products from roasting or smelting furnaces, or from other sources.

I claim:

1. In a process of oxidizing sulfur dioxide to sulfur trioxide in presence of water, the method comprising dispersing the liquid phase into the gaseous phase, the amount of water present being insufficient to unite with the whole of the sulfur trioxide resulting from the oxidation.

2. In a process of oxidizing sulfur dioxide to sulfur trioxide in presence of water, the method comprising dispersing the liquid phase into the gaseous phase, in presence of a catalyst, the amount of water present being insufficient to unite with the whole of the sulfur trioxide resulting from the oxidation.

3. In a process of oxidizing sulfur dioxide to sulfur trioxide in presence of water, the method comprising dispersing the liquid phase into the gaseous phase, in presence of an oxy-nitrogen catalyst, the amount of water present being insufficient to unite with the whole of the sulfur trioxide resulting from the oxidation.

4. In a process of making sulphuric acid by oxidation to $SO_3$ in presence of $H_2O$, the method of accelerating the reactions between liquid and gaseous phase components, which consists in dispersing the liquid phase into the gaseous phase and re-collecting the same, said liquid phase containing insufficient $H_2O$ to react with the whole of the $SO_3$ resulting from the oxidation.

5. In a process of making sulphuric acid by oxidation to $SO_3$ in presence of $H_2O$ the method of accelerating the reactions between liquid and gaseous phase components, which consists in alternately and repeatedly dispersing the liquid phase into the gaseous phase and re-collecting the same, said liquid phase containing insufficient $H_2O$ to react with the whole of the $SO_3$ resulting from the oxidation.

6. The method of oxidizing $SO_2$ to $SO_3$ which comprises bringing a gas mixture containing sulfur dioxide and oxygen into contact with nitroso-sulphuric acid in a state of extreme dispersion, whereby $SO_2$ and $O_2$ become adsorbed upon the surface of the liquid particles and react to form $SO_3$, thereupon coalescing the minute particles of liquid particles into larger masses, whereby the adsorption power of the liquid is reduced and $SO_3$ is liberated, and absorbing the $SO_3$ in concentrated sulphuric acid.

7. In a process of making sulphuric acid by oxidation of sulfur dioxide in presence of water, the method of accelerating the reaction between the liquid phase, which comprises an oxy-nitrogen catalyst, and the gaseous $SO_2$ containing phase, which consists in continuously and so highly dispersing the liquid phase as to present the maximum area of reacting and adsorbing surface between the gas and liquid, the liquid containing insufficient water to react with the whole of the sulfur trioxide resulting from the reaction, and recovering sulphuric anhydrid from the stream of gases.

8. A process as claimed in claim 7 including the step of removing the heat of reaction by continuously circulating and cooling the liquid.

9. The method of making sulphuric acid which comprises subjecting the gases formed by the method of claim 7, said gases containing sulphuric anhydrid and nitrogen oxides, to intimate reaction with highly dispersed sulphuric acid of about 60 degrees Baumé, in liquid phase, and then absorbing the purified sulphuric anhydrid in concentrated acid of about 98 per cent $H_2SO_4$ content.

10. The method as claimed in claim 9 in which the sulphuric anhydrid is brought into intimate molecular contact with highly dispersed concentrated sulphuric acid.

11. A sulphuric acid plant comprising a reaction apparatus, an apparatus for absorbing nitrous oxides, and an apparatus for absorbing sulphuric anhydrid, each apparatus having means for mechanically producing an exceedingly high dispersion of liquids into the gas stream, means for passing the gases through the apparatus in series, and means connected to the reaction apparatus and to the first absorption apparatus, for cooling and circulating the liquids therethrough.

In testimony whereof, I affix my signature.

WM. F. LAMOREAUX.